(12) United States Patent
Zhang

(10) Patent No.: US 10,671,118 B1
(45) Date of Patent: Jun. 2, 2020

(54) APPARATUS, SYSTEM, AND METHOD FOR IMAGE NORMALIZATION FOR ADJUSTABLE HEAD-MOUNTED DISPLAYS

(71) Applicant: FACEBOOK TECHNOLOGIES, LLC, Menlo Park, CA (US)

(72) Inventor: Rui Zhang, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 193 days.

(21) Appl. No.: 15/708,095

(22) Filed: Sep. 18, 2017

(51) Int. Cl.
G09G 5/00 (2006.01)
G06F 1/16 (2006.01)
G06T 11/60 (2006.01)
G01L 1/22 (2006.01)
G02B 7/12 (2006.01)

(52) U.S. Cl.
CPC ............ *G06F 1/163* (2013.01); *G01L 1/2281* (2013.01); *G02B 7/12* (2013.01); *G06F 1/1637* (2013.01); *G06F 1/1652* (2013.01); *G06T 11/60* (2013.01)

(58) Field of Classification Search
CPC ......... G02B 27/017; G02B 7/12; G06F 3/011; G06F 3/012; G06F 3/013
See application file for complete search history.

(56) References Cited

U.S. PATENT DOCUMENTS

| | | | | |
|---|---|---|---|---|
| 9,529,194 B2* | 12/2016 | Yoo | ..................... | G02B 27/0101 |
| 9,864,201 B2* | 1/2018 | Kim | ................... | G02B 27/0179 |
| 10,187,633 B2* | 1/2019 | Bickerstaff | .......... | G02B 27/017 |
| 10,257,492 B2* | 4/2019 | Raghoebardajal | ... | H04N 19/132 |
| 2013/0181888 A1* | 7/2013 | Kuriya | ................. | G02B 27/017 345/8 |
| 2015/0138645 A1* | 5/2015 | Yoo | ..................... | G02B 27/0101 359/630 |
| 2015/0219902 A1* | 8/2015 | Kim | ................... | G02B 27/0179 345/8 |
| 2019/0068944 A1* | 2/2019 | Zhang | .................. | G02B 27/017 |

OTHER PUBLICATIONS

Peter Wesley Bristol et al.; Apparatus, System, and Method for Adjusting Head-Mounted-Display Straps; U.S. Appl. No. 15/582,566, filed Apr. 28, 2017.
Rui Zhang et al.; Apparatus, System, and Method for Interpupillary-Distance-Adjustable Head-Mounted Displays; U.S. Appl. No. 15/691,443, filed Aug. 30, 2017.

* cited by examiner

*Primary Examiner* — Vijay Shankar
(74) *Attorney, Agent, or Firm* — FisherBroyles, LLP

(57) ABSTRACT

An apparatus for head-mounted displays may include (i) a flexible planar support frame, (ii) a left eye cup coupled to a left side of the flexible planar support frame and a right eye cup coupled to a right side of the flexible planar support frame, (iii) left-eye and right-eye display screen areas mounted to the flexible planar support frame such that the left-eye display screen area projects toward a left eye aperture defined by the left eye cup and the right-eye display screen area projects toward a right eye aperture defined by the right eye cup, and (iv) a deflection sensor coupled to the flexible planar support frame that generates a deflection signal describing an extent to which the support frame is bent, where images displayed by the left-eye and right-eye display screen areas are normalized based on the deflection signal. Various other devices, systems, and methods are also disclosed.

20 Claims, 14 Drawing Sheets

APPARATUS, SYSTEM, AND METHOD FOR IMAGE NORMALIZATION FOR ADJUSTABLE HEAD-MOUNTED DISPLAYS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation-governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be a poorly calibrated headset. For example, if the spacing between viewing lenses does not match the distance between a user's pupils, the user may experience eye strain, blurred vision, and/or facial discomfort.

Traditional virtual reality headsets may provide some limited options for addressing a poor calibration, but these options may be sub-optimal. For example, traditional adjustment mechanisms may involve widening an assembly, which may constrain attempts to design a headset with a small form factor. In addition, traditional adjustment mechanisms may involve many moving parts, potentially increasing manufacturing costs while also increasing the number of mechanical failure points. Some traditional adjustment mechanisms may provide a poor or uncomfortable fit for some users. In addition, some traditional adjustment mechanisms may interfere with proper viewing (e.g., because eye pieces may move apart while display screens stay in place).

SUMMARY

The disclosure provided herein describes and illustrates various apparatuses, systems, and methods for image normalization for adjustable head-mounted displays. As will be explained in greater detail below, an adjustable display apparatus may angle display areas either inward (to point toward close-set eyes) or outward (to point toward wide-set eyes) by bending a flexible support frame within which the display areas are embedded, while normalizing images within the display areas to prevent apparent distortion that would be caused by bending and/or shifting the display areas relative to viewing optics.

In some examples, an apparatus for image normalization for adjustable head-mounted displays may include a flexible planar support frame. The apparatus may also include a left eye cup coupled to a left side of the flexible planar support frame and a right eye cup coupled to a right side of the flexible planar support frame. The apparatus may additionally include a left-eye display screen area mounted to the flexible planar support frame such that the left-eye display screen area projects toward a left eye aperture defined by the left eye cup. Likewise, the apparatus may include a right-eye display screen area mounted to the flexible planar support frame such that the right-eye display screen area projects to a right eye aperture defined by the right eye cup. The apparatus may further include a deflection sensor coupled to the flexible planar support frame that generates a deflection signal describing an extent to which the flexible planar support frame is bent, where images displayed by the left-eye display screen area and the right-eye display screen area are normalized based at least in part on the deflection signal.

In some examples, the flexible planar support frame may be bendable such that the distance between a projection of the left-eye display screen area and a projection of the right-eye display screen area onto a viewing plane varies as the flexible planar support frame bends, thereby adjusting for varying interpupillary distances.

According to some examples, the deflection sensor transmits the deflection signal to a compensation module that adjusts images displayed by the left-eye display screen area and the right-eye display screen area based at least in part on the deflection signal to normalize a projection of the images to a user's eyes to correct for apparent distortion caused by moving the left-eye display screen area and right-eye display screen area relative to the user's eyes. In some examples, the deflection sensor may include a strain gauge.

In some examples, the left eye cup may be coupled to the left side of the flexible planar support frame at a left side of the left eye cup and the right eye cup is coupled to the right side of the flexible planar support frame at a right side of the right eye cup. In these examples, a right side of the left eye cup may separate from the flexible planar support frame as the flexible planar support frame bends and a left side of the right eye cup may separate from the flexible planar support frame as the flexible planar support frame bends. In addition, in these examples a compensation module may estimate a degree to which the left eye cup and right eye cup separate from the flexible planar support frame. The compensation module may normalize the images displayed by the left-eye display screen area and the right-eye display screen area based at least in part on the estimated degree to which the left eye cup and right eye cup separate from the flexible planar support frame.

In one example, the flexible planar support frame may be bendable toward a user's face such that the distance between the projection of the left-eye display screen area and the projection of the right-eye display screen area decreases, thereby adjusting for a reduced interpupillary distance.

In another example, the flexible planar support frame may be bendable away from a user's face such that the distance between the projection of the left-eye display screen area and the projection of the right-eye display screen area increases, thereby adjusting for a wider interpupillary distance.

In some examples, the left-eye display screen area and the right-eye display screen area may be separate display screens that angle toward each other as the flexible planar support frame bends toward a user's face and that angle away from each other as the flexible planar support frame bends away from the user's face. Alternatively, the left-eye display screen area and the right-eye display screen area may include areas of an integral display screen that uses a flexible display material, allowing the integral display screen to bend as the flexible planar support frame bends.

The apparatus may also include an actuator that controls a degree to which the flexible planar support frame bends. For example, the actuator may include a dial and a translating element that translates rotation of the dial into linear movement of a bending element. The bending element may be coupled to the flexible planar support frame and bend the flexible planar support frame via linear movement.

In some examples, the apparatus may further include a rigid holding element that is coupled to the flexible planar support frame at a center position between the left-eye display screen area and the right-eye display screen area. In these examples, the flexible planar support frame may bend around the rigid holding element. The apparatus may additionally include a pair of lenses coupled to the left eye cup and the right eye cup.

A corresponding system for image normalization for adjustable head-mounted displays may include a flexible planar support frame. The system may also include a left eye cup coupled to a left side of the flexible planar support frame and a right eye cup coupled to a right side of the flexible planar support frame. The system may additionally include a left-eye display screen area mounted to the flexible planar support frame such that the left-eye display screen area projects toward a left eye aperture defined by the left eye cup. Likewise, the system may include a right-eye display screen area mounted to the flexible planar support frame such that the right-eye display screen area projects to a right eye aperture defined by the right eye cup. The apparatus may further include a deflection sensor coupled to the flexible planar support frame that generates a deflection signal describing an extent to which the flexible planar support frame is bent, where images displayed by the left-eye display screen area and the right-eye display screen area are normalized based at least in part on the deflection signal. The system may also include a head mount coupled to the adjustable display apparatus that, when worn by a user, holds the adjustable display apparatus to the user's face such that the left-eye display screen area projects to the user's left eye and the right-eye display screen area projects to the user's right eye.

In some examples, the flexible planar support frame may be bendable such that the distance between a projection of the left-eye display screen area and a projection of the right-eye display screen area onto a viewing plane varies as the flexible planar support frame bends, thereby adjusting for varying interpupillary distances.

According to some examples, the deflection sensor transmits the deflection signal to a compensation module that adjusts images displayed by the left-eye display screen area and the right-eye display screen area based at least in part on the deflection signal to normalize a projection of the images to a user's eyes to correct for apparent distortion caused by moving the left-eye display screen area and right-eye display screen area relative to the user's eyes. In some examples, the deflection sensor may include a strain gauge.

In some examples, the left eye cup may be coupled to the left side of the flexible planar support frame at a left side of the left eye cup and the right eye cup is coupled to the right side of the flexible planar support frame at a right side of the right eye cup. In these examples, a right side of the left eye cup may separate from the flexible planar support frame as the flexible planar support frame bends and a left side of the right eye cup may separate from the flexible planar support frame as the flexible planar support frame bends. In addition, in these examples a compensation module may estimate a degree to which the left eye cup and right eye cup separate from the flexible planar support frame. The compensation module may normalize the images displayed by the left-eye display screen area and the right-eye display screen area based at least in part on the estimated degree to which the left eye cup and right eye cup separate from the flexible planar support frame.

In addition to the various systems and apparatuses described herein, the instant disclosure presents exemplary methods associated with image normalization for adjustable head-mounted displays. For example, a method may include coupling, to a flexible planar support frame, a left eye cup at a left side of the flexible planar support frame and a right eye cup at a right side of the flexible planar support frame. The method may also include mounting, to the flexible planar support frame, a left-eye display screen area, such that the left-eye display screen area projects toward a left eye aperture defined by the left eye cup, and a right-eye display screen area, such that the right-eye display screen area projects toward a right eye aperture defined by the right eye cup. The method may additionally include mounting, to the flexible planar support frame, a deflection sensor that generates a deflection signal describing an extent to which the flexible planar support frame is bent, where images displayed by the left-eye display screen area and the right-eye display screen area are normalized based at least in part on the deflection signal.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
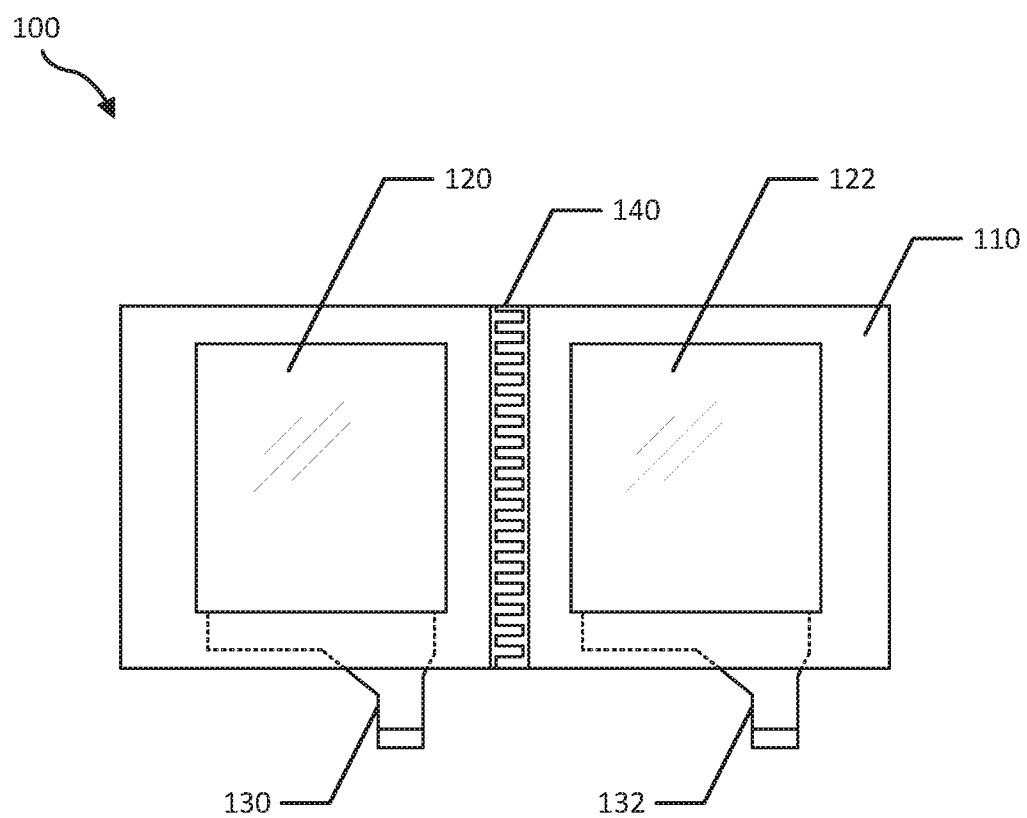
FIG. 1 is a front view of a flexible display with a deflection sensor.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for image normalization for adjustable head-mounted displays (e.g., adjustable for differing interpupillary distances). As will be explained in greater detail below, an adjustment mechanism may angle display areas either inward (to point toward close-set eyes) or outward (to point toward wide-set eyes) by bending a flexible support frame within which the display areas are embedded. By adjusting for interpupillary distance via deflection of display areas (rather than, e.g., laterally sliding eye pieces together or apart along a fixed track), the systems discussed may allow for head-mounted displays with reduced form factors (e.g., because adjusting for wide-set eyes may not require creating a wide display assembly). In addition, in some examples the adjustment mechanisms described herein may require relatively few moving parts, thereby potentially decreasing manufacturing costs while also decreasing the number of mechanical failure points. In some examples, the systems described herein may provide a more comfortable fit for a wider variety of users. Additionally or alternatively, the systems described herein may accommodate a wider range of interpupillary distances (e.g., very wide-set eyes and/or very close-set eyes) than traditional headsets.

In addition, a signal from a deflection sensor (e.g., embedded in the display and/or support frame) may indicate the degree to which the display is bent. Based on the signal, one or more systems may normalize images displayed within the display areas such that when the images are projected to a user, the user perceives the images as without distortion (e.g., distortion that may otherwise be perceived due to the bending, angling, and/or shifting of the display area relative to the user's eyes and/or to optics of a display apparatus). As discussed in greater detail below, these and other disclosed embodiments, whether used alone or in combination, may help optimize the immersiveness, enjoyability, and/or utility of a virtual- or augmented-reality experience.

Figure 2:
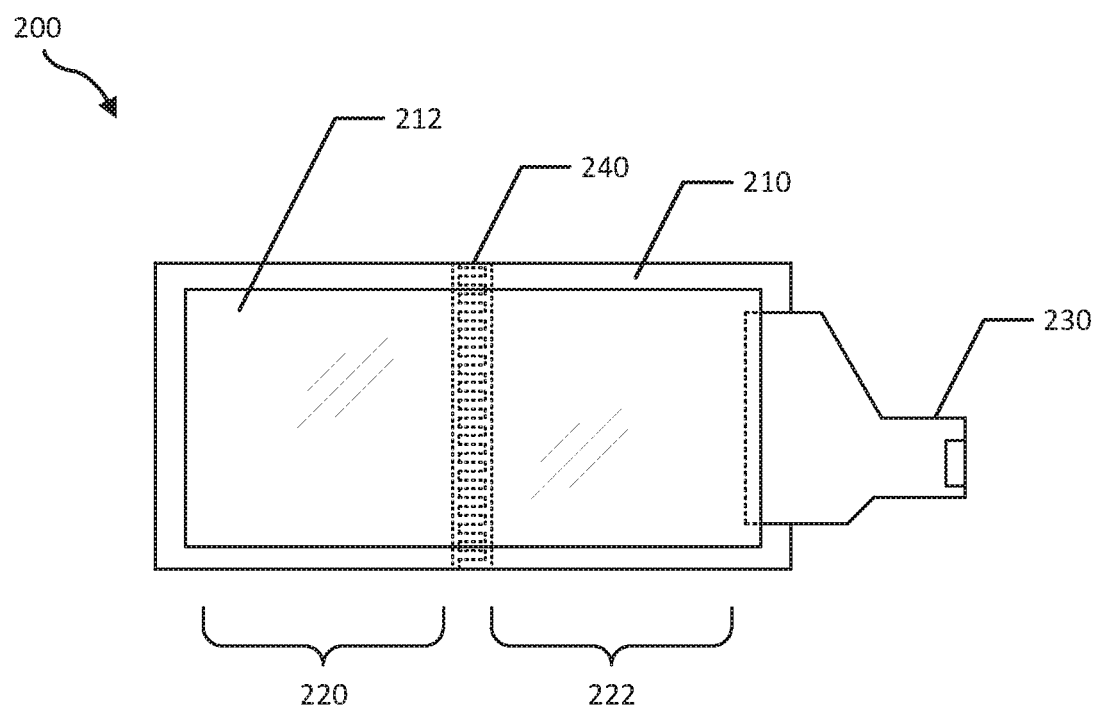
FIG. 2 is a front view of another flexible display with a deflection sensor.

The following will provide, with reference to FIGS. 1-2, examples of displays that may be adjustable and normalize displayed images based on adjustments. In addition, the discussion associated with FIGS. 3-6, 7A, 7B, 8A, and 8B will provide examples of apparatuses that may include displays (such as the displays illustrated in FIGS. 1-2). The discussion associated with FIG. 9 will provide examples of a head-mounted display system. Furthermore, the discussion corresponding to FIGS. 10-13 will provide examples of a head-mounted display system that includes an adjustable display apparatus, such as those illustrated in FIGS. 3-6. Finally, the discussion associated with FIG. 14 will provide examples of methods for manufacturing, assembling, configuring, and/or using the image-normalizing display adjustment mechanisms presented herein.

FIG. 1 illustrates a flexible display 100. As shown in FIG. 1, flexible display 100 may include a flexible planar support frame 110. Flexible display 100 may also include a display screen 120 and a display screen 122 mounted to support frame 110. Flexible display 100 may also include a connector 130 for display screen 120 and a connector 132 for display screen 122. Flexible display 100 may additionally include a deflection sensor 140.

Support frame 110 may be constructed with any suitable material to enable support frame 110 to bend at a vertical axis running between display screens 120 and 122. For example, support frame 110 may be constructed with any flexible rubber, polymer, metal, and/or composite material. In some examples, all of support frame 110 may be flexible. In addition, portions of support frame 110 may be flexible while other portions may be rigid. For example, portions of support frame 110 between display screens 120 and 122 may be flexible while other portions of support frame 110 may be flexible or rigid.

Display screens 120 and 122 may include any suitable type of display screen. In some examples, display screens 120 and 122 may be rigid and/or based on rigid substrates. For example, display screens 120 and 122 may include liquid crystal displays (LCDs) or organic light emitting diode (OLED) displays with rigid substrates. In these examples, as support frame 110 bends, display screens 120 and 122 may rotate (e.g., around the axis at which support frame 110 bends) inward or outward, but remain unbent. In some examples, display screens 120 and 122 may be flexible and/or based on flexible substrates. For example, display screens 120 and 122 may include OLED displays with flexible substrates. In these examples, display screens 120 and 122 may bend as support frame 110 bends. Whether display screens 120 and 122 are flexible or rigid, as support frame 110 bends, the normal lines to the surfaces of display screens 120 and 122 may point inward (when support frame 110 bends inward) or outward (when support frame 110 bends outward). In some examples, display screen 120 may display images designated for a left eye and display screen 122 may display images designated for a right eye. In some examples, display 100 may be reorientable such that display screen 122 is to a user's left side and display screen 120 is to the user's right side. In these examples, the systems described herein may designate display screen 122 as a left-eye display and display screen 120 as a right-eye display (while also, e.g., reorienting images displayed within display screens 120 and 122 so that the images do not appear to be top-bottom or left-right inverted).

Connectors 130 and 132 may include any suitable type of connector for transmitting power and/or data to display screens 120 and 122. For example, connectors 130 and 132 may represent ribbon cables that provide power and data to display screens 120 and 122. In some examples, connectors 130 and 132 may connect display screens 120 and 122 to one or more display subsystems and/or power supplies. In some examples, connectors 130 and 132 may include flexible material and may be dimensioned to provide sufficient slack to maintain connections as display screens 120 and 122 move when support frame 110 bends.

Deflection sensor 140 may include any suitable type of sensor that may indicate a degree to which flexible display 100 is bent. As will be explained in greater detail below, determining the degree to which flexible display 100 is bent may allow systems described herein to normalize images displayed by display screens 120 and 122 such that the relative movement and/or angling of display screens 120 and 122 with respect to corresponding optics of a display apparatus and/or a user's eyes do not produce apparent distortion from the perspective of the user.

In some examples, deflection sensor 140 may include a strain gauge. The strain gauge may include any type of measurement device capable of indicating (e.g., directly or indirectly) the degree to which flexible display 100 is bent. For example, the strain gauge may be attached to display 100 (e.g., to support frame 110) such that the strain gauge deforms as display 100 bends. In some examples, the strain gauge may include a material (e.g., metal) that, when deformed, exhibits a change in resistance. Deflection sensor 140 may thereby indirectly indicate an angle at which flexible display 100 is bent by indicating a change in resistance.

As shown in FIG. 1, in some examples deflection sensor 140 may be mounted to support frame 110, between display screens 120 and 122. For example, deflection sensor 140 may run along an inflection line of support frame 110 (e.g., a line around which support frame 110 bends).

FIG. 2 illustrates a flexible display 200. As shown in FIG. 2, flexible display 200 may include a flexible planar support frame 210. Flexible display 200 may also include a display screen 212 mounted to support frame 210. Display screen 212 may include a display screen area 220 and a display screen area 222. Flexible display 200 may also include a connector 230 for display screen 212. Flexible display 200 may additionally include a deflection sensor 240.

Support frame 210 may be constructed with any suitable material to enable support frame 210 to bend at a vertical axis dividing display screen 212 approximately in half, running between display screen areas 220 and 222. For example, support frame 210 may be constructed with any flexible rubber, polymer, metal, and/or composite material. In some examples, all of support frame 210 may be flexible. In addition, portions of support frame 210 may be flexible while other portions may be rigid. For example, portions of support frame 210 between display screens areas 220 and 222 and/or substantially near the horizontal center of support frame 210 may be flexible while other portions of support frame 210 may be flexible or rigid.

Display screen 212 may include any suitable type of display screen. In some examples, display screen 212 may be flexible and/or based on a flexible substrate. For example, display screen 212 may include a single OLED display with a flexible substrate. Accordingly, display screen 212 may bend as support frame 210 bends. As support frame 210 bends, the normal lines to the surfaces of display screen areas 220 and 222 may point inward (when support frame 210 bends inward) or outward (when support frame 210 bends outward). In some examples, display screen area 220 may display images designated for a left eye and display screen area 222 may display images designated for a right eye. In some examples, display 200 may be reorientable such that display screen area 222 is to a user's left side and display screen area 220 is to the user's right side. In these examples, the systems described herein may designate display screen area 222 as a left-eye display area and display screen area 220 as a right-eye display area (while also, e.g., reorienting images displayed within display screen areas 220 and 222 so that the images do not appear to be top-bottom or left-right inverted).

By using a display with a flexible substrate, the systems described herein may include display screen areas 220 and 222 in a single, integral display screen while still allowing display screen areas 220 and 222 to angle inward and/or outward relative to each other. In some examples, use of a single, integral display screen may reduce manufacturing costs, reduce design constraints, avoid duplicative parts and/or connections, and/or reduce points of failure in a head-mounted display system.

Connector 230 may include any suitable type of connector for transmitting power and/or data to display screen 212. For example, connector 230 may represent a ribbon cable that provides power and data to display screen 212. In some examples, connector 230 may connect display screen 212 to a display subsystem and/or power supply. In some examples, connector 230 may include flexible material and may be dimensioned to provide sufficient slack to maintain connections as display screen 212 moves when support frame 210 bends.

Deflection sensor 240 may include any suitable type of sensor that may indicate a degree to which flexible display 200 is bent. As will be explained in greater detail below, determining the degree to which flexible display 200 is bent may allow systems described herein to normalize images displayed by display screen areas 220 and 222 such that the relative movement and/or angling of display screen areas 220 and 222 with respect to corresponding optics of a display apparatus and/or a user's eyes do not produce apparent distortion from the perspective of the user.

In some examples, deflection sensor 240 may include a strain gauge. The strain gauge may include any type of measurement device capable of indicating (e.g., directly or indirectly) the degree to which flexible display 200 is bent. For example, the strain gauge may be attached to display screen 212 and/or support frame 210 such that the strain gauge deforms as display 200 bends. In some examples, the strain gauge may include a material (e.g., metal) that, when deformed, exhibits a change in resistance. Deflection sensor 240 may thereby indirectly indicate an angle at which flexible display 200 is bent by indicating a change in resistance.

In some examples, deflection sensor 240 may be mounted to support frame 210, between display screen areas 220 and 222. Additionally or alternatively, deflection sensor 240 may be mounted to display screen 212, between display screen areas 220 and 222. For example, deflection sensor 240 may run along an inflection line of display 200 (e.g., a line around which display 200 bends).

Figure 3:
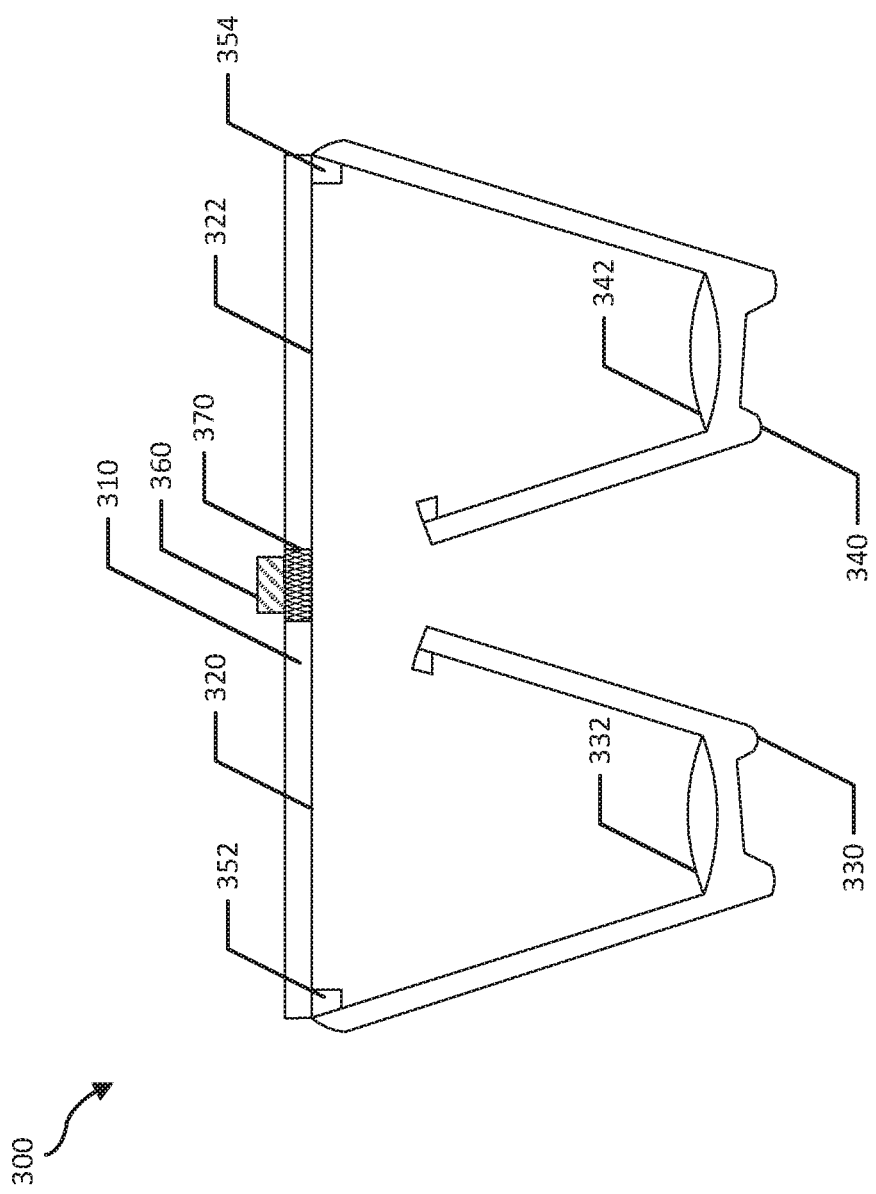
FIG. 3 is a top view of a flexible display apparatus.

FIG. 3 illustrates a flexible display apparatus 300. As shown in FIG. 3, display apparatus 300 may include a flexible display 310. Flexible display 310 may include a left-eye display screen area 320 and a right-eye display screen area 322. Display apparatus 300 may also include a left eye cup 330 and a right eye cup 340. Display apparatus 300 may further include a lens 332 coupled to left eye cup 330 and a lens 342 coupled to right eye cup 340. Display apparatus 300 may additionally include a fastener 352 that couples left eye cup 330 to flexible display 310 and a fastener 354 that couples right eye cup 340 to display 310. Additionally, display apparatus 300 may include a rigid holding element 360 coupled to display 310. Display apparatus 300 may also include a deflection sensor 370 coupled to flexible display 310.

Flexible display 310 may represent any suitable display. For example, flexible display 310 may represent display 100 shown in FIG. 1 or display 200 shown in FIG. 2. Accordingly, in some examples (e.g., where display 310 represents display 100), left-eye display screen area 320 and right-eye display screen area 322 may represent separate display screens (e.g., display screen 120 and display screen 122). In some examples (e.g., where display 310 represents display 200), left-eye display screen area 320 and right-eye display screen area 322 may represent two distinct areas within the same display screen (e.g., areas 220 and 222 within display screen 212). Generally, flexible display 310 may represent any type of display that includes a flexible planar support frame with two display screen areas (e.g., a left-eye area and a right-eye area).

As shown in FIG. 3, eye cups 330 and 340 may hold lenses 332 and 342, respectively. Thus, lens 332 may transmit images displayed in display screen area 320 to a user's left eye and lens 342 may transmit images displayed in display screen area 322 to a user's right eye. Eye cups 330 and 340 may be coupled to display 310 in any suitable manner. For example, fasteners 352 and 354 may represent clips that rigidly couple eye cups 330 and 340 to display 310 (such that when display 310 bends and display screen areas 320 and 322 rotate, eye cups 330 and 340 with lenses 332 and 342 also rotate). In some examples, lenses 332 and 342 may be shaped (or otherwise adapted) to focus projections from display screen areas 320 and 322.

Rigid holding element 360 may represent any material rigidly coupled to display 310. In some examples, rigid holding element 360 may stay in place as display 310 bends. Thus, the center of display 310 may remain in place as the edges of display 310 bend toward or away from a user's face.

Deflection sensor 370 may include any suitable device for measuring the degree to which display 310 is bent. For example, deflection sensor 370 may include a strain gauge.

Figure 4:
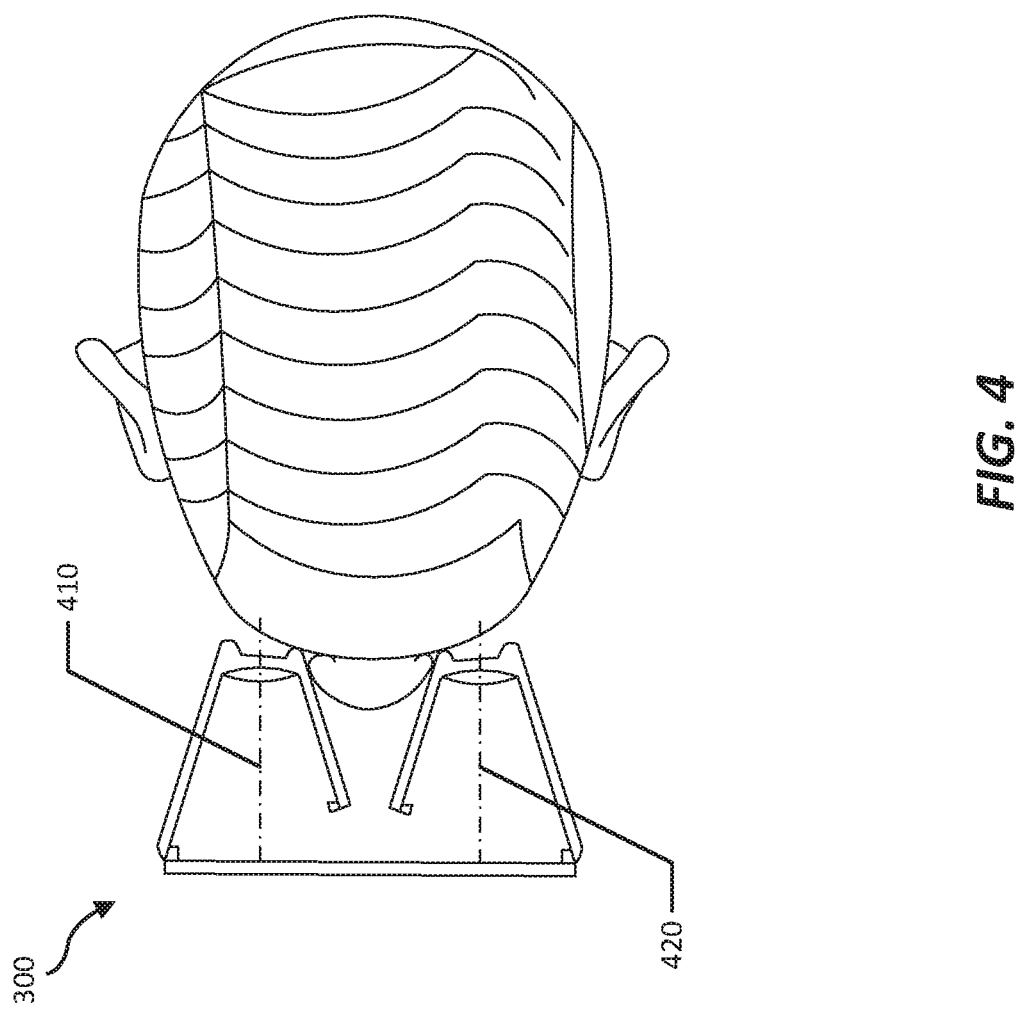
FIG. 4 is a top view of a flexible display apparatus fitted to a user with a given interpupillary distance.

FIG. 4 shows an example of display apparatus 300 as fitted to a user. As shown in FIG. 4, display screen area 322 may project a projection 410 to the user's right eye and display screen area 320 may project a projection 420 to the user's left eye. Because display 310 is not bent, display 310 may be effectively configured for an interpupillary distance substantially equal to the distance between the centers of display screen areas 320 and 322. As projections 410 and 420 intersect the viewing plane (the plane approximately parallel to the user's face and tangential to the user's eyes), the distance between projections 410 and 420 may represent a corresponding interpupillary distance. In addition, because display 310 is not bent, projections 410 and 420 may appear undistorted to the user without normalization. Accordingly, when a deflection sensor within display apparatus 300 indicates that display 310 is not bent, systems described herein may not interfere with images displayed on display screen areas 320 and 322.

Figure 5:
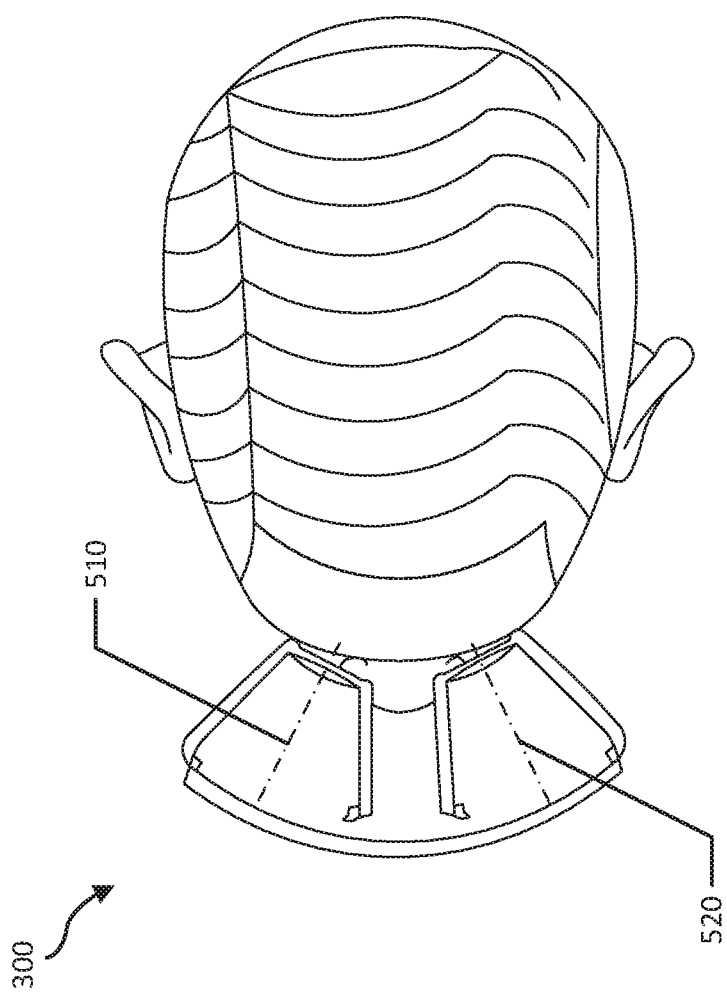
FIG. 5 is a top view of a flexible display apparatus fitted to a user with a narrower interpupillary distance than in FIG. 4.

FIG. 5 shows an example of display apparatus 300 in a different configuration than in FIG. 4. As shown in FIG. 5, display 310 may be bent toward the user's face, thereby angling display screen areas 320 and 322, eye cups 330 and 340, and lenses 332 and 342 inward. Thus, the distance between projections 510 and 520 as they intersect the viewing plane may be smaller than in the case of FIG. 4, representing a corresponding smaller interpupillary distance. Accordingly, the configuration of display 310 in FIG. 5 may be adapted for a user with close-set eyes. In addition, because display 310 is bent, projections 510 and 520 may appear distorted to the user without normalization. For example, some portions of display screen areas 320 and 322 may be closer to the user after bending, affecting their apparent relative size. In addition, some portions of display screen areas 320 and 322 may appear more laterally compressed from the perspective of the user. Accordingly, when a deflection sensor within display apparatus 300 indicates how display 310 is bent, systems described herein may first normalize images displayed on display screen areas 320 and 322 such that projections 510 and 520 appear to the user of FIG. 5 as projections 410 and 420 would appear to the user of FIG. 4.

Figure 6:
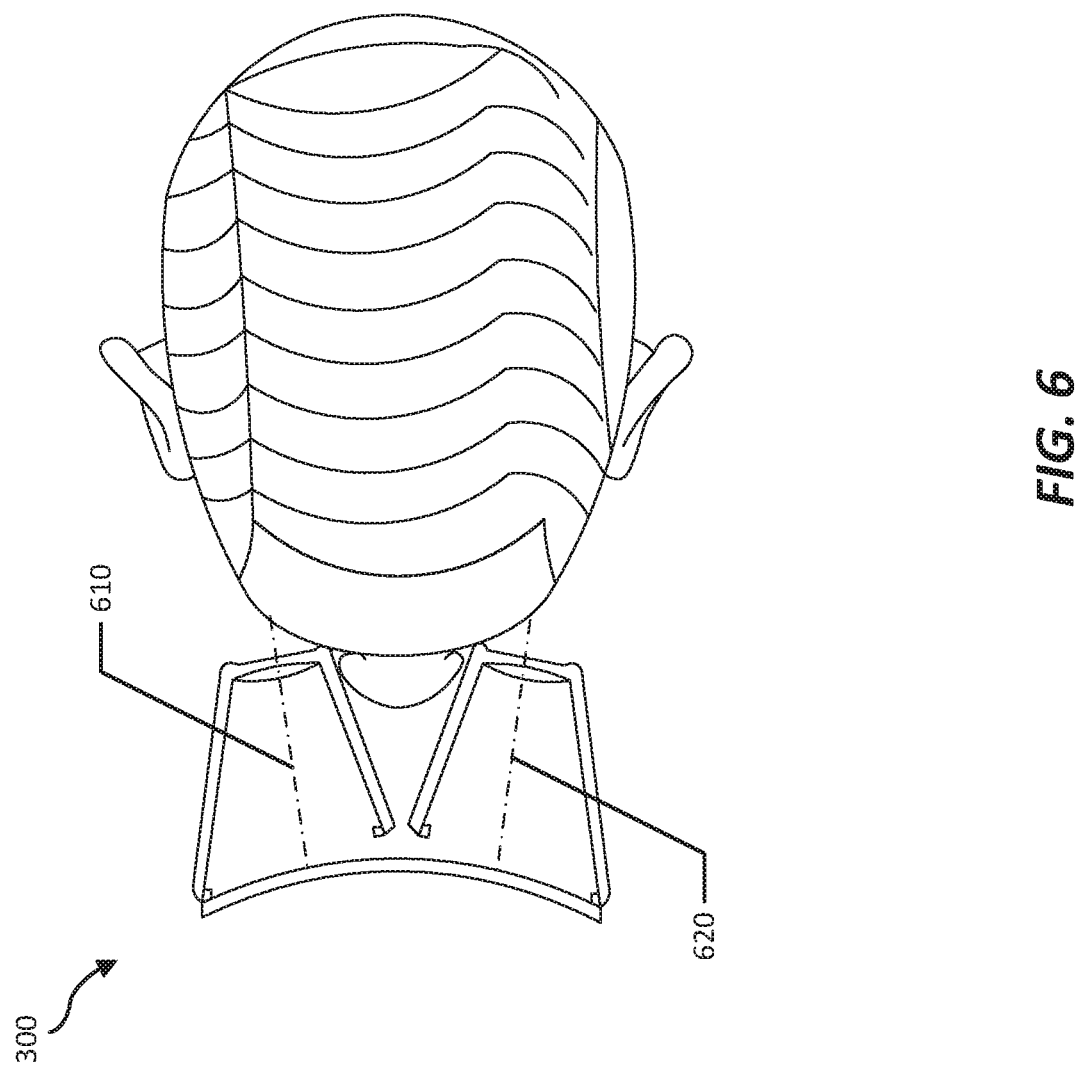
FIG. 6 is a top view of a flexible display apparatus fitted to a user with a wider interpupillary distance than in FIG. 4.

FIG. 6 shows an example of display apparatus 300 in a different configuration than in FIGS. 4 and 5. As shown in FIG. 6, display 310 may be bent away from the user's face, thereby angling display screen areas 320 and 322, eye cups 330 and 340, and lenses 332 and 342 outward. Thus, the distance between projections 610 and 620 as they intersect the viewing plane may be greater than in the case of FIGS. 4 and 5, representing a corresponding greater interpupillary distance. Accordingly, the configuration of display 310 in FIG. 6 may be adapted for a user with wide-set eyes. As may be appreciated by the illustration in FIG. 6, although the illustrated configuration of display apparatus 300 accommodates wider-set eyes than does the illustration configuration in FIG. 4, display apparatus 300 is no wider in the illustrated configuration of FIG. 6. Thus, display apparatus 300 may simultaneously accommodate wide-set eyes and a constrained form factor. In addition, because display 310 is bent, projections 610 and 620 may appear distorted to the user without normalization. For example, some portions of display screen areas 320 and 322 may be further to the user after bending, affecting their apparent relative size. In addition, some portions of display screen areas 320 and 322 may appear more laterally compressed from the perspective of the user. Accordingly, when a deflection sensor within display apparatus 300 indicates how display 310 is bent, systems described herein may first normalize images displayed on display screen areas 320 and 322 such that projections 610 and 620 appear to the user of FIG. 5 as projections 410 and 420 would appear to the user of FIG. 4.

Figure 7A:
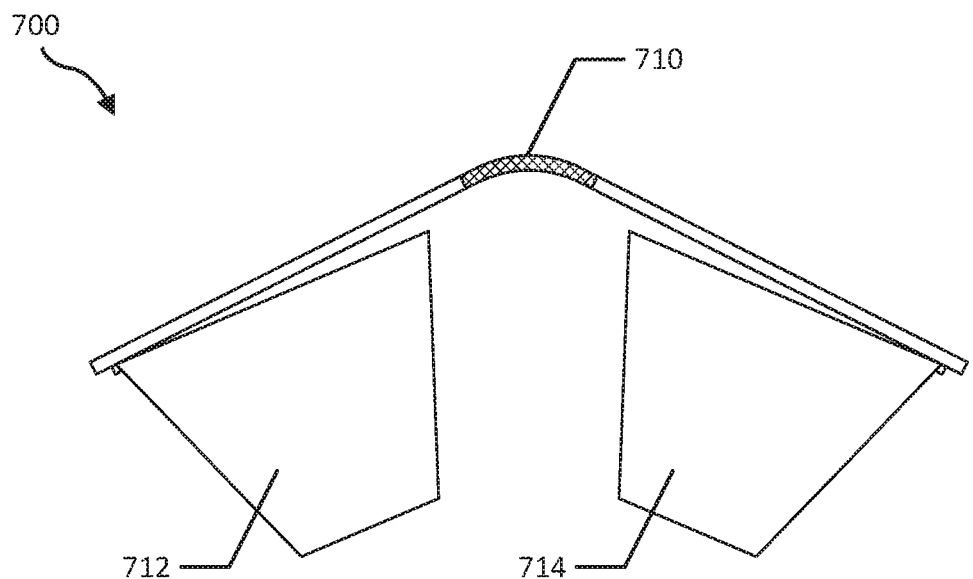
FIG. 7A is a top view of a flexible display apparatus with a deflection sensor, bent to a given degree.

FIGS. 7A, 7B, 8A, and 8B provide examples of how deflection of a flexible display apparatus may affect the relative position of optics and displays screen areas within the flexible display apparatus. As shown in FIG. 7A, an adjustable display apparatus 700 may include a deflection sensor 710 and eye cups 712 and 714. In one example, eye cups 712 and 714 may hold lenses through which a user views the display. As shown in FIG. 7A, when display apparatus 700 is bent, eye cups 712 and 714 may angle inward. However, because eye cups 712 and 714 are coupled to the far ends of the display, the right side of eye cup 712 and the left side of eye cup 714 may separate from the display, affecting the relative position of the display and the lenses. Thus, systems described herein may account for the separation when normalizing images displayed by adjustable display apparatus 700 as bent in FIG. 7A.

Figure 7B:
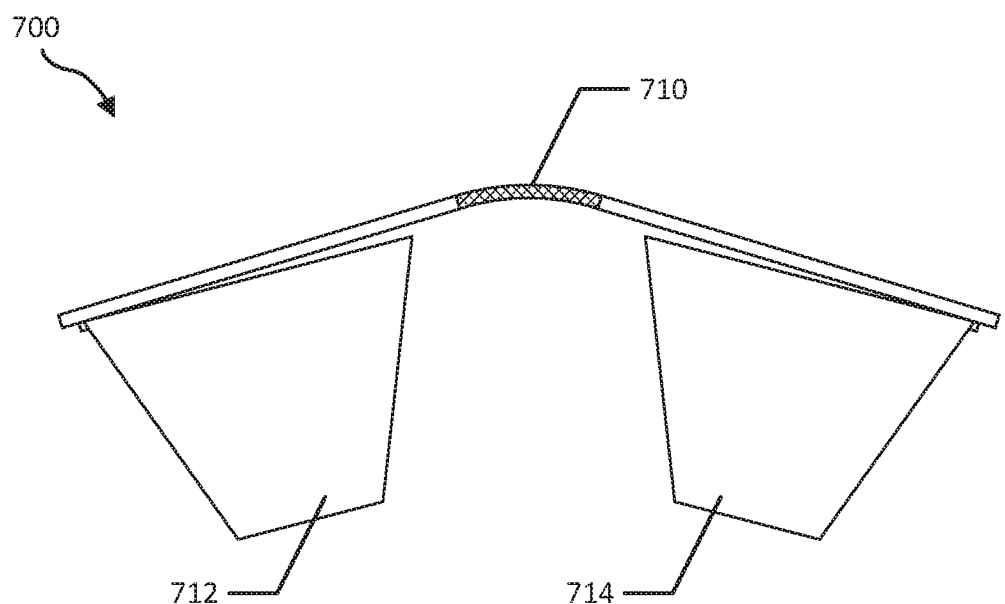
FIG. 7B is a top view of a flexible display apparatus with a deflection sensor, bent less than in FIG. 7A.

As shown in FIG. 7B, display apparatus 700 may be bent to a lesser degree than in FIG. 7A. Accordingly, eye cups 712 and 714 may angle inward to a lesser degree. In addition, the right side of eye cup 712 and the left side of eye cup 714 may separate from the display, also to a lesser degree. The smaller separation may affect the relative position of the display and the lenses to a lesser degree than in FIG. 7A. Thus, systems described herein may account for the lesser degree of separation when normalizing images displayed by adjustable display apparatus 700 as bent in FIG. 7B.

Figure 8A:
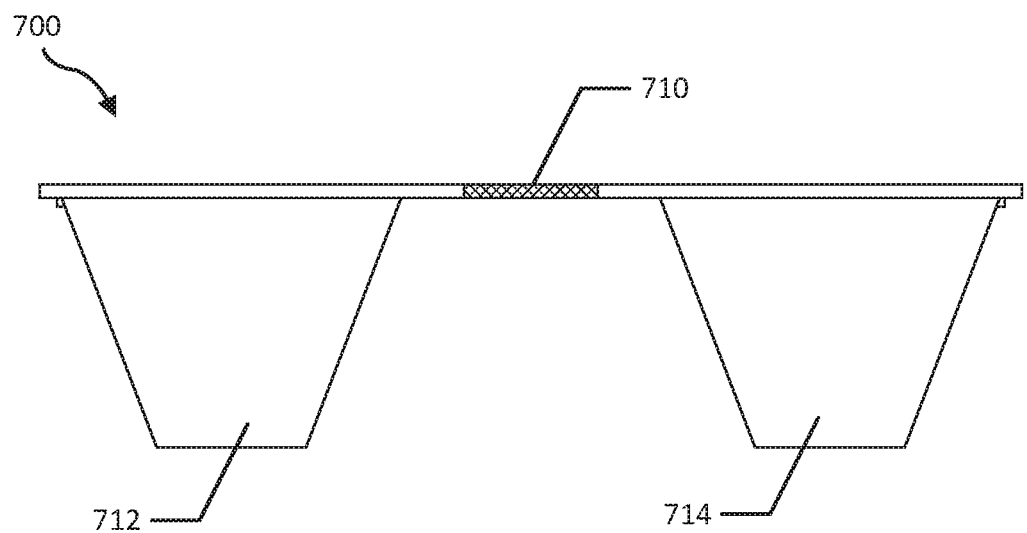
FIG. 8A is a top view of a flexible display apparatus with a deflection sensor, unbent.

As shown in FIG. 8A, display apparatus 700 may be unbent. Accordingly, eye cups 712 and 714 may not be angled inward. In addition, the right side of eye cup 712 and the left side of eye cup 714 may aligned next to, rather than separated from, the display. Thus, systems described herein not normalize images displayed by adjustable display apparatus 700 when unbent.

Figure 8B:
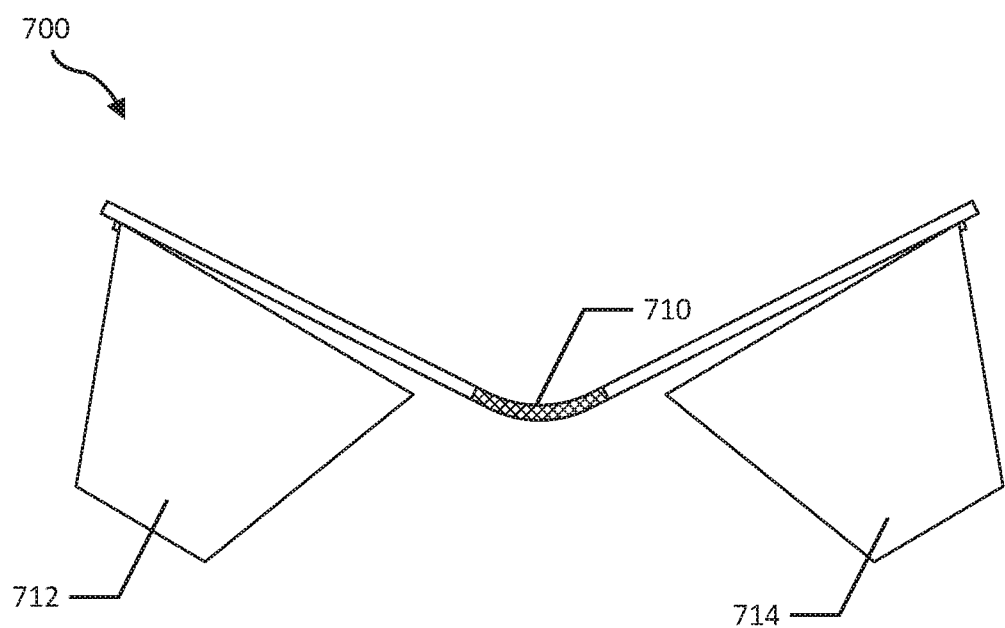
FIG. 8B is a top view of a flexible display apparatus with a deflection sensor, bent in the opposition direction of the bending in FIG. 7A.

As shown in FIG. 8B, display apparatus 700 may be bent in a direction opposite to that shown in FIG. 7A. Accordingly, eye cups 712 and 714 may angle outward instead of inward. However, as in FIG. 7A, the right side of eye cup 712 and the left side of eye cup 714 may separate from the display. The separation may affect the relative position of the display and the lenses, as in FIG. 7A. Thus, systems described herein may account for the separation when normalizing images displayed by adjustable display apparatus 700 as bent in FIG. 8B.

Figure 9:
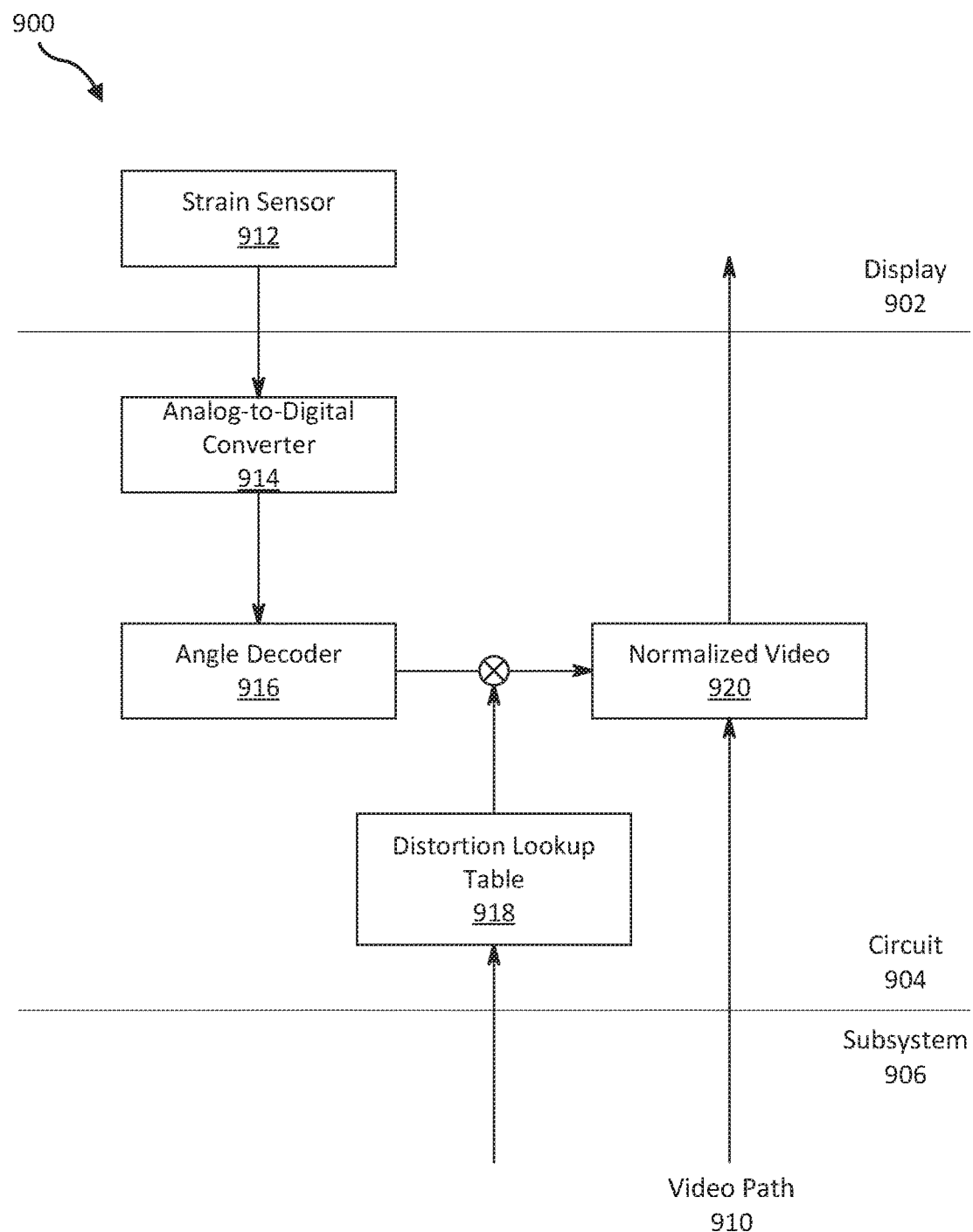
FIG. 9 is a block diagram of a head-mounted display system.

FIG. 9 illustrates a system 900 that normalizes images projected by adjustable head-mounted displays. As shown in FIG. 9, system 900 may include a display 902, a circuit 904, and a subsystem 906. Display 902 and circuit 904 may be communicatively coupled. Likewise, circuit 904 and subsystem 906 may be communicatively coupled. Display 902 may include a strain sensor 912. As display 902 bends, strain sensor 912 may transmit a signal of increasing magnitude to an analog-to-digital converter 914 in circuit 904. Analog-to-digital converter 914 may convert the signal from strain sensor 912 to a digital value and transmit the digital value to an angle decoder 916 within circuit 904. Angle decoder 916 may translate the digital value into an estimation of the angle to which display 902 is bent. Angle decoder 916 may estimate the deflection angle in any of a variety of ways. For example, angle decoder 916 may use a formula (e.g., derived from known properties of the strain sensor and/or from observation) to estimate the deflection angle based on the digital value. Additionally or alternatively, angle decoder 916 may consult a lookup table (e.g., derived from observation) based on the digital value. In some examples, angle decoder 916 may respond to calibration feedback (e.g., from subsystem 906 and/or a user) to adjust future estimates of the deflection angle.

Circuit 904 may then combine the estimated deflection angle from angle decoder 916 with information stored in a distortion lookup table 918 to determine a correction to apply to images in a video path 910. For example, circuit 904 may look up, in distortion lookup table 918, a correcting projection to apply to each frame of video in video path 910 based on the estimated angle. Distortion lookup table 918 may be set in any suitable manner. For example, projections to apply to each angle value may be set in distortion lookup table 918 based on one or more formulas that model the distortion caused by bending display 902. Additionally or alternatively, information in distortion lookup table 918 may be based at least in part on observations and/or manufacturer calibrations. In some examples, distortion lookup table 918 may be set, updated, and/or modified during a calibration process initiated by a user. By applying correcting projections to images in video path 910, circuit 904 may generate normalized video 920, circuit 904 may transmit to display 902 for display.

In some examples, one or more additional elements may influence the correction applied from the distortion lookup table 918 to video path 910. For example, as mentioned earlier, one or more calibration steps may adjust the signal sent by strain sensor 912, analog-to-digital converter 914, angle decoder 916, and/or distortion lookup table 918. In some examples, a temperature sensor may contribute to estimating the deflection angle of display 902. For example, strain sensor 912 may give consistent values for a given deflection angle at constant temperatures, but measurements by strain sensor 912 may be influenced by temperature changes (e.g., due to the effect of temperature on electrical resistance that may be measured by strain sensor 912). Accordingly, one or more elements of strain sensor 912 and/or circuit 904 may combine information from strain sensor 912 and the temperature sensor in order to forward a temperature-invariant signal to angle decoder 916. In some examples, circuit 904 may update the estimated deflection angle in response to display 902 being adjusted (e.g., by a user). Thus, the estimated angle may stay consistent except when an update is expected rather than fluctuating as the signal from strain sensor 912 fluctuates due to minor variations in measurement. In some examples, as will be explained in greater detail below, a user may adjust the display via a dial. In some examples, a sensor may read the current dial setting, and one or more of the systems described herein may use the current dial setting (e.g., alone or in combination with data from the strain sensor) to estimate the current deflection angle.

Circuit 904 may represent any suitable circuit for implementing image normalization. In some examples, circuit 904 may represent a graphics processing unit (GPU) and/or any other type of hardware accelerator designed to optimize graphics processing. Additionally or alternatively, circuit 904 may represent a system on a chip (SOC). As illustrated in FIG. 9, in some examples angle decoder 916 and/or distortion lookup table 918 may form parts of circuit 502. Additionally or alternatively, angle decoder 916 and/or distortion lookup table 918 may form parts of display 902 and/or subsystem 906. In some examples, one or more portions of circuit 904 may include one or more hardware modules. Additionally or alternatively, one or more portions of circuit 904 may include one or more software modules that perform one or more of the tasks described herein when stored in the memory of a computing device and executed by a hardware processor of a computing device.

Subsystem 906 may represent any suitable system for providing display data for an adjustable display apparatus. In some examples, subsystem may represent a graphics processing unit (GPU) and/or any other type of hardware accelerator designed to optimize graphics processing. Additionally or alternatively, subsystem 906 may represent a computing device for a head-mounted display system.

Figure 10:
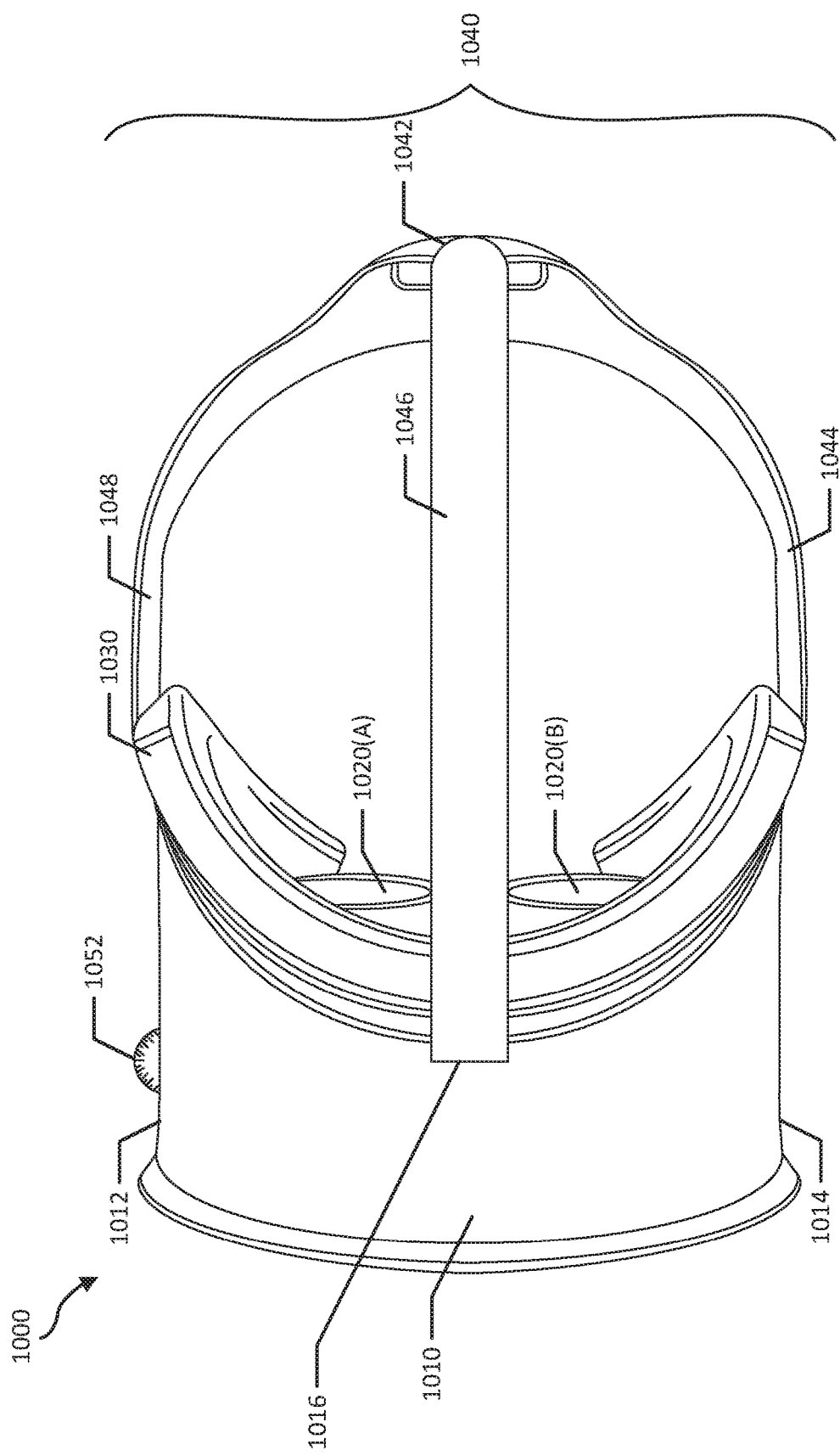
FIG. 10 is a top view of a head-mounted display system.

FIGS. 10-13 provide an example of a head-mounted-display system that includes an adjustable display apparatus and a head mount. FIG. 10 is a top view of a head-mounted-display system 1000. As shown in FIG. 10, head-mounted display 1010 may include eye pieces 1020(A)-(B) (which may replace, augment, and/or correspond to eye cups 330 and 340 illustrated in FIG. 3 and/or eye cups 712 and 714 in FIGS. 7A, 7B, 8A, and 8B) and a facial-interface system 1030 (e.g., a cushion). Head-mounted display 1010 may also be coupled to a strap system 1040, which may include a back section 1042 that forms a coupling point for a left-side section 1044, a top section 1046, and a right-side section 1048. Left-side section 1044 of strap system 1040 may be coupled to a left side 1014 of head-mounted-display system 1000, right-side section 1048 may be coupled to a right side 1012 of head-mounted-display system 1000, and top section 1046 may be coupled to a top portion or area 1016 of head-mounted display 1010.

Furthermore, head-mounted-display system 1000 may include a means for adjusting head-mounted display 1010 (e.g., by bending a flexible display screen frame within head-mounted display 1010). For example, head-mounted-display system 1000 may include a dial 1052 that, when rotated, may adjust the position and/or orientation of internal display screen areas and/or eye pieces 1020(A)-(B). While dial 1052 is illustrated on the right side of head-mounted display 1010, a dial may be located in any suitable location (e.g., on the left side of head-mounted display 1010, on top of head-mounted display 1010, underneath head-mounted display 1010, etc.). In some examples, head-mounted-display system 1000 may include a pair of dials (e.g., one on the right side of head-mounted display 1010 and one on the left side of head-mounted display 1010), either of which may be used to adjust head-mounted display 1010.

Figure 11:
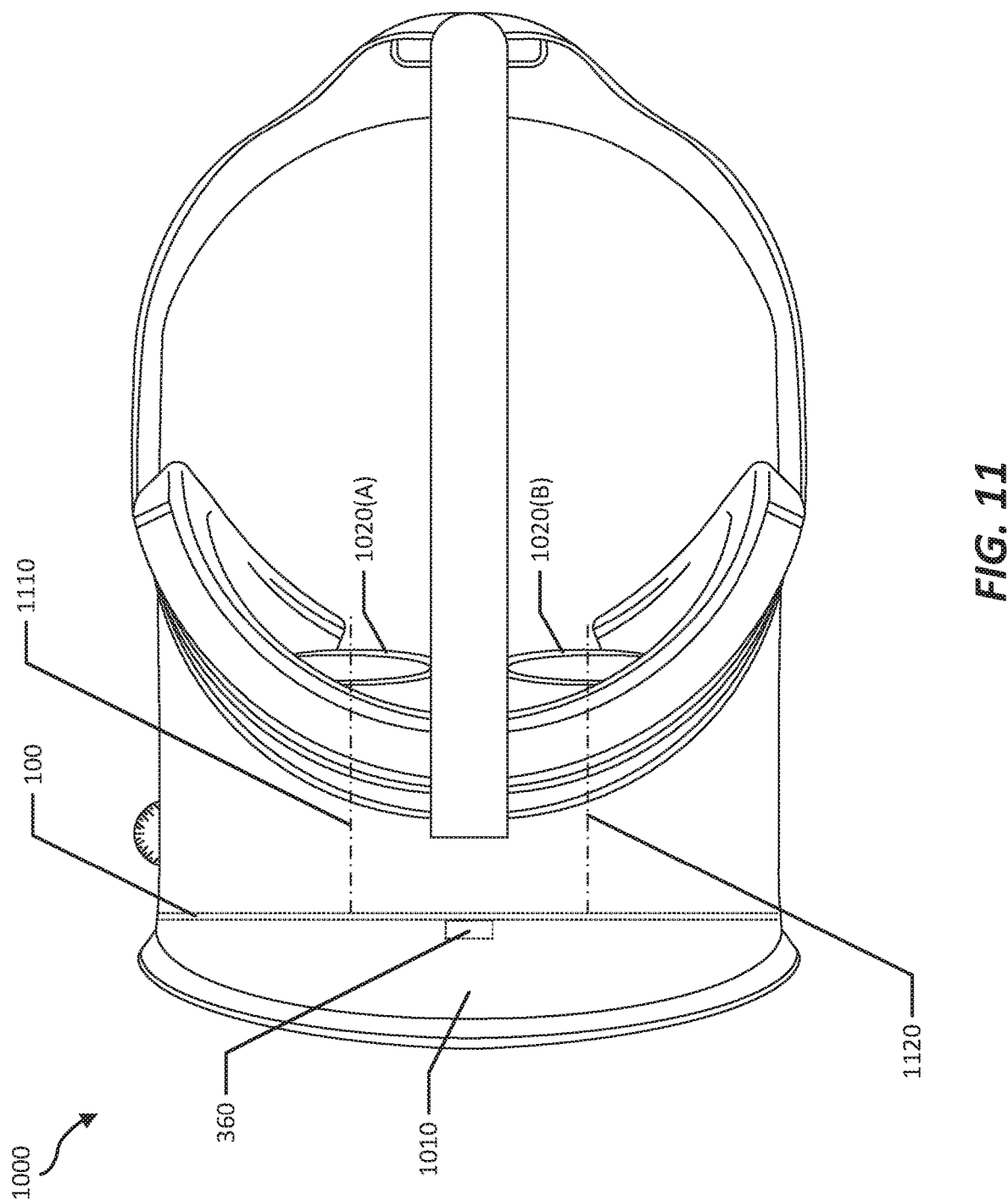
FIG. 11 is a top view of a head-mounted display system with a flexible display apparatus set for a given interpupillary distance.
Figure 12:
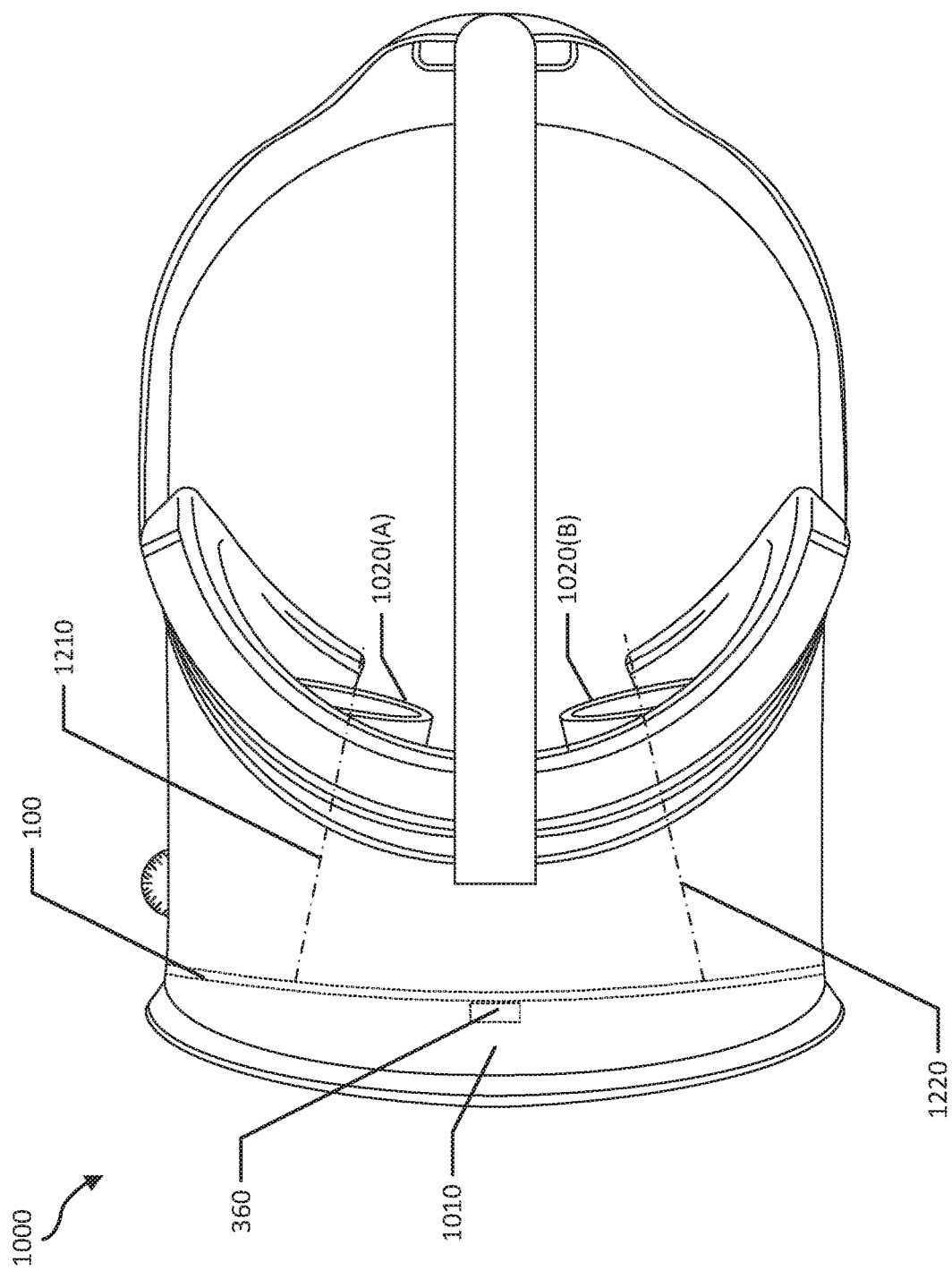
FIG. 12 is a top view of a head-mounted display system with a flexible display apparatus set for a narrower interpupillary distance.
Figure 13:
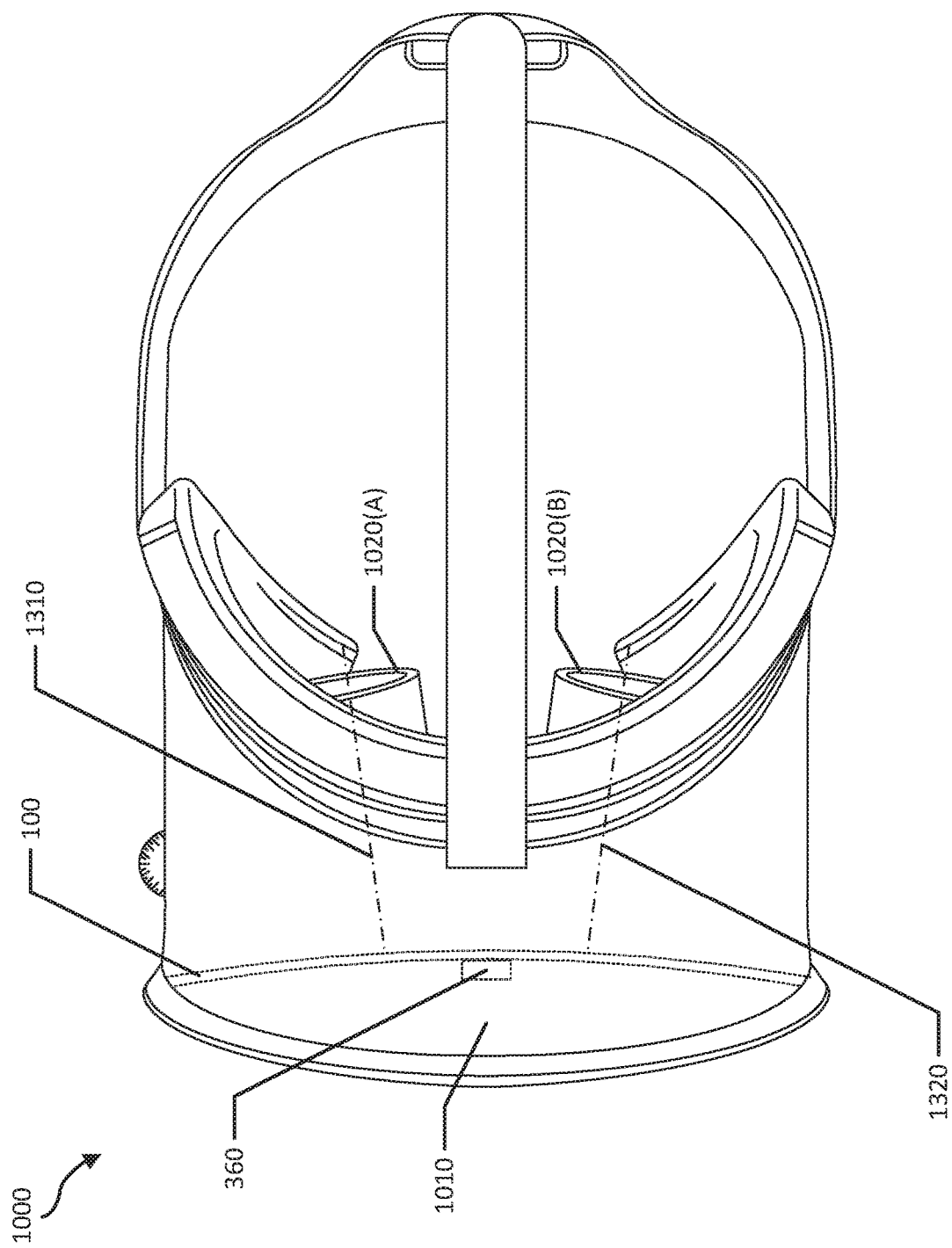
FIG. 13 is a top view of a head-mounted display system with a flexible display apparatus set for a wider interpupillary distance.

FIGS. 11-13 illustrate, by way of example, a flexible display apparatus in different configurations within head-mounted display system 1000. For example, as shown in FIG. 11, display 100 may form a part of head-mounted display 1010. For example, display 100 may be coupled to rigid holding element 360 which, in turn, may be coupled to an encasement of head-mounted display 1010. As shown in FIG. 11, display 100 may be in a substantially neutral (i.e., unbent) state, projections 1110 and 1120 may be substantially parallel, and eye pieces 1020(A)-(B) may be in a substantially parallel orientation. In some examples, this configuration may be considered a neutral configuration for purposes of image normalization, such that no image normalization is applied to display 100 (or, e.g., applied normalization steps may produce no difference to displayed images). In other examples, however, the neutral configuration may involve display 100 bent to a certain degree. In these examples, systems described herein may apply image normalization to correct for the deviation from the neutral configuration.

FIG. 12 shows head-mounted display system 1000 in a different configuration state. For example, a user may have rotated dial 1052 to bend display 100 toward the viewing plane. As shown in FIG. 12, rigid holding element 360 may stay in place, and the ends of display 100 may bend inward. Accordingly, projections 1210 and 1220 may be directed inward, resulting in a reduced distance between projections 1210 and 1220 as they reach the ends of eye pieces 1020(A)-(B). Eye pieces 1020(A)-(B) may also be angled inward (e.g., substantially aligning with projections 1210 and 1220). Thus, the configuration state in FIG. 12 may be more suitable for closer-set eyes than the configuration state in FIG. 11. In some examples, systems described herein may normalize images projected by display 100 to correct for the deviations in the configuration shown in FIG. 12 from the neutral configuration (e.g., that shown in FIG. 11).

FIG. 13 shows head-mounted display system 1000 in a different configuration state. For example, a user may have rotated dial 1052 to bend display 100 away from the viewing plane. As shown in FIG. 10, rigid holding element 360 may stay in place, and the ends of display 100 may bend outward. Accordingly, projections 1310 and 1320 may be directed outward, resulting in an increased distance between projections 1310 and 1320 as they reach the ends of eye pieces 1020(A)-(B). Eye pieces 1020(A)-(B) may also be angled outward (e.g., substantially aligning with projections 1310 and 1320). Thus, the configuration state in FIG. 13 may be more suitable for wider-set eyes than the configuration states in FIGS. 11-12. In some examples, systems described herein may normalize images projected by display 100 to correct for the deviations in the configuration shown in FIG. 13 from the neutral configuration (e.g., that shown in FIG. 11).

Although FIGS. 11-13 reference display 100 by way of example, it may be appreciated that display 100 may be substituted with display 200 or any other suitable flexible display. In addition, while FIGS. 10-13 illustrate dial 752 by way of example, the systems described herein may include any suitable actuator that controls a degree to which the flexible planar support frame bends. Where a dial is used, these systems may also include a translating element that translates rotation of the dial into linear movement of a bending element that is coupled to the flexible planar support frame and that bends the flexible planar support frame via linear movement. For example, the linear movement may be applied to the ends of the flexible planar support frame (e.g., to push the ends of the flexible planar support frame away from the user's face and the viewing plane or to push the ends of the flexible planar support frame toward the user's face and the viewing plane). In some examples, the adjustment mechanism may include a geared mechanism that enables a user to adjust the deflection of the flexible display (and, thus, to adjust the effective interpupillary distance configuration of the head-mounted-display system) with a high degree of granularity.

Figure 14:
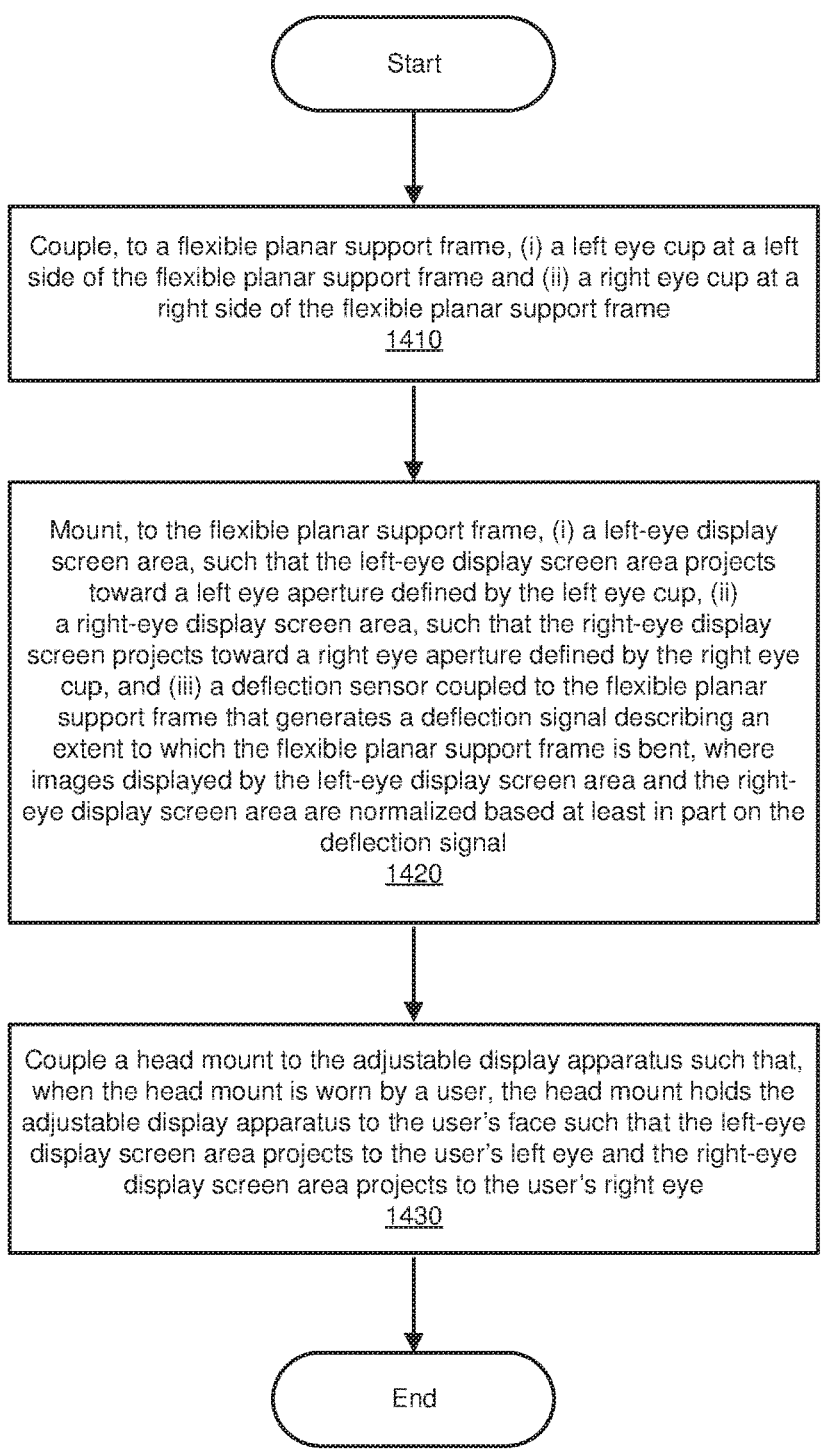
FIG. 14 is a flow diagram of a method for assembling a head-mounted display system with an image-normalizing flexible display apparatus.

FIG. 14 shows a flow diagram of an exemplary method 1400 for manufacturing, assembling, and/or configuring one or more of the systems and apparatuses described herein. As shown in FIG. 14, at step 1410 a left eye cup may be coupled to a left side of a flexible planar support frame and a right eye cup may be coupled to a right side of a flexible planar support frame. For example, as shown in FIG. 3, eye cup 330 may be coupled to the left side of flexible display 310 (e.g., to the flexible planar support frame that forms a part of flexible display 310) with fastener 352 and eye cup 340 may be coupled to the right side of flexible display 310 with fastener 354. Thus, eye cups 330 and 340 may be secured to flexible display 310 such that eye cups 330 and 340 angle outward or inward as display areas 320 and 322 angle outward or inward. In some examples, however, the eye cups may not angle to the same degree as the display areas. For example, as shown in FIGS. 7A, 7B, and 8B, eye cups 712 and 714 may separate from display apparatus 700 as display apparatus 700 bends.

At step 1420, a left-eye display screen area and a right-eye display screen area may be mounted to the flexible planar support frame. Taking FIG. 1 as an example, display screen 120 and display screen 122 may be mounted to flexible planar support frame 110. Taking FIG. 2 as an example, display screen areas 220 and 222 may both form a part of the integral display screen 212. Accordingly, display screen areas 220 and 222 may be mounted to flexible planar support frame 210 by mounting display screen 212 to support frame 210. One or more display screens may be mounted to the flexible planar support frame in any suitable manner. For example, a display screen may be mounted to the flexible planar support frame with a flexible adhesive. Additionally or alternatively, a display screen may be mounted to the flexible planar support frame with a molding process to create a flexible frame that fits around the display screen.

The left- and right-eye display screen areas and the left and right eye cups may be mounted and coupled in positions such that the left-eye display screen area projects toward a left eye aperture defined by the left eye cup and the right-eye display screen area projects toward a right eye aperture defined by the right eye cup.

In addition, a deflection sensor may be coupled to the flexible planar support frame such that the deflection sensor generates a deflection signal describing an extent to which the flexible planar support frame is bent. Taking FIG. 1 as an example, deflection sensor 140 may be coupled to support frame 110 (e.g., adhered to the back of support frame 110). Taking FIG. 2 as an example, deflection sensor 240 may be coupled to display screen 212 and/or support frame 210. In some examples, deflection sensor 240 may be adhered to display screen 212 between display screen areas 220 and 222.

The deflection sensor may also be communicatively coupled to an image normalization device, such the image normalization device receives a deflection signal from the deflection sensor describing the extent to which the display is bent and normalizes images displayed by the display based at least in part on the deflection signal. Using FIG. 9 as an example, strain sensor 912 may be connected (e.g., via a cable that carries digital signals) to circuit 904. In some examples, the communicative connection may be established via wireless communication. For example, strain sensor 912 may be coupled to a wireless transmitter and transmit signals via the wireless transmitter to circuit 904.

As described above, an image-normalizing adjustable display apparatus may compensate for image distortion caused by flexible virtual reality display panels. While flexible virtual reality display panels may allow for interpupillary distance adjustment, they may cause images distortion by creating a gap between virtual reality optics and the flexed display panel. To account for and correct this, a strain sensor embedded within the flexible display panel between the virtual reality eye cups may detect and measure the amount of panel strain and/or displacement. A lookup table that contains predetermined image distortion corrections to apply to various strain values may then be referenced, an appropriate image distortion correction may be identified and applied, and the resulting data may be output to the display panel.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   an adjustable display apparatus comprising:
   a flexible planar support frame;
   a left eye cup coupled to a left side of the flexible planar support frame;
   a right eye cup coupled to a right side of the flexible planar support frame;
   a left-eye display screen area mounted to the flexible planar support frame such that the left-eye display screen area projects toward a left eye aperture defined by the left eye cup;
   a right-eye display screen area mounted to the flexible planar support frame such that the right-eye display screen area projects toward a right eye aperture defined by the right eye cup; and
   a deflection sensor coupled to the flexible planar support frame that generates a deflection signal describing an extent to which the flexible planar support frame is bent, wherein images displayed by the left-eye display screen area and the right-eye display screen area are normalized based at least in part on the deflection signal;
   wherein the flexible planar support frame is bendable along a vertical axis between the left-eye display screen area and the right-eye display screen area such that the left-eye display screen area and the right-eye display screen area deflect as the flexible planar support frame bends, altering a direction of a projection of the left-eye display screen area and a projection of the right-eye display screen area to cause a distance between the projection of the left-eye display screen area and the projection of the right-eye display screen area onto a viewing plane to vary as the flexible planar support frame bends, thereby adjusting for varying interpupillary distances; and
   a head mount coupled to the adjustable display apparatus that, when worn by a user, holds the adjustable display apparatus to the user's face such that the left-eye display screen area projects to the user's left eye and the right-eye display screen area projects to the user's right eye.

2. The system of claim 1, wherein the flexible planar support frame is bendable such that a distance between a projection of the left-eye display screen area and a projection of the right-eye display screen area onto a viewing plane varies as the flexible planar support frame bends, thereby adjusting for varying interpupillary distances.

3. The system of claim 1, wherein the deflection sensor transmits the deflection signal to a compensation module that adjusts images displayed by the left-eye display screen area and the right-eye display screen area based at least in part on the deflection signal to normalize a projection of the images to a user's eyes to correct for apparent distortion caused by moving the left-eye display screen area and right-eye display screen area relative to the user's eyes.

4. The system of claim 1, wherein the deflection sensor comprises a strain gauge.

5. The system of claim 1, wherein:
   the left eye cup is coupled to the left side of the flexible planar support frame at a left side of the left eye cup;
   the right eye cup is coupled to the right side of the flexible planar support frame at a right side of the right eye cup;
   a right side of the left eye cup separates from the flexible planar support frame as the flexible planar support frame bends; and
   a left side of the right eye cup separates from the flexible planar support frame as the flexible planar support frame bends.

6. The system of claim 5, wherein:
   a compensation module estimates a degree to which the left eye cup and right eye cup separate from the flexible planar support frame; and
   the compensation module normalizes the images displayed by the left-eye display screen area and the right-eye display screen area based at least in part on the estimated degree to which the left eye cup and right eye cup separate from the flexible planar support frame.

7. A method comprising:

coupling, to a flexible planar support frame:
- a left eye cup at a left side of the flexible planar support frame; and
- a right eye cup at a right side of the flexible planar support frame; and mounting, to the flexible planar support frame:
- a left-eye display screen area, such that the left-eye display screen area projects toward a left eye aperture defined by the left eye cup;
- a right-eye display screen area, such that the right-eye display screen area projects toward a right eye aperture defined by the right eye cup; and
- a deflection sensor that generates a deflection signal describing an extent to which the flexible planar support frame is bent, wherein images displayed by the left-eye display screen area and the right-eye display screen area are normalized based at least in part on the deflection signal; and
- wherein the flexible planar support frame is bendable along a vertical axis between the left-eye display screen area and the right-eye display screen area such that the left-eye display screen area and the right-eye display screen area deflect as the flexible planar support frame bends, altering a direction of a projection of the left-eye display screen area and a projection of the right-eye display screen area to cause a distance between the projection of the left-eye display screen area and the projection of the right-eye display screen area onto a viewing plane to vary as the flexible planar support frame bends, thereby adjusting for varying interpupillary distances.

8. An apparatus comprising:
- a flexible planar support frame;
- a left eye cup coupled to a left side of the flexible planar support frame;
- a right eye cup coupled to a right side of the flexible planar support frame;
- a left-eye display screen area mounted to the flexible planar support frame such that the left-eye display screen area projects toward a left eye aperture defined by the left eye cup;
- a right-eye display screen area mounted to the flexible planar support frame such that the right-eye display screen area projects toward a right eye aperture defined by the right eye cup; and
- a deflection sensor coupled to the flexible planar support frame that generates a deflection signal describing an extent to which the flexible planar support frame is bent, wherein images displayed by the left-eye display screen area and the right-eye display screen area are normalized based at least in part on the deflection signal; and
- wherein the flexible planar support frame is bendable along a vertical axis between the left-eye display screen area and the right-eye display screen area such that the left-eye display screen area and the right-eye display screen area deflect as the flexible planar support frame bends, altering a direction of a projection of the left-eye display screen area and a projection of the right-eye display screen area to cause a distance between the projection of the left-eye display screen area and the projection of the right-eye display screen area onto a viewing plane to vary as the flexible planar support frame bends, thereby adjusting for varying interpupillary distances.

9. The apparatus of claim 8, wherein the flexible planar support frame is bendable such that a distance between a projection of the left-eye display screen area and a projection of the right-eye display screen area onto a viewing plane varies as the flexible planar support frame bends, thereby adjusting for varying interpupillary distances.

10. The apparatus of claim 8, wherein the deflection sensor transmits the deflection signal to a compensation module that adjusts images displayed by the left-eye display screen area and the right-eye display screen area based at least in part on the deflection signal to normalize a projection of the images to a user's eyes to correct for apparent distortion caused by moving the left-eye display screen area and right-eye display screen area relative to the user's eyes.

11. The apparatus of claim 8, wherein the deflection sensor comprises a strain gauge.

12. The apparatus of claim 8, wherein:
- the left eye cup is coupled to the left side of the flexible planar support frame at a left side of the left eye cup;
- the right eye cup is coupled to the right side of the flexible planar support frame at a right side of the right eye cup;
- a right side of the left eye cup separates from the flexible planar support frame as the flexible planar support frame bends; and
- a left side of the right eye cup separates from the flexible planar support frame as the flexible planar support frame bends.

13. The apparatus of claim 12, wherein:
- a compensation module estimates a degree to which the left eye cup and right eye cup separate from the flexible planar support frame; and
- the compensation module normalizes the images displayed by the left-eye display screen area and the right-eye display screen area based at least in part on the estimated degree to which the left eye cup and right eye cup separate from the flexible planar support frame.

14. The apparatus of claim 8, wherein the flexible planar support frame is bendable away from a user's face such that a distance between a projection of the left-eye display screen area and a projection of the right-eye display screen area increases, thereby adjusting for an increased interpupillary distance.

15. The apparatus of claim 8, wherein the left-eye display screen area and the right-eye display screen area comprise separate display screens that angle toward each other as the flexible planar support frame bends toward a user's face and that angle away from each other as the flexible planar support frame bends away from the user's face.

16. The apparatus of claim 8, wherein the left-eye display screen area and the right-eye display screen area comprise areas of an integral display screen, the integral display screen comprising a flexible display material, allowing the integral display screen to bend as the flexible planar support frame bends.

17. The apparatus of claim 8, further comprising an actuator that controls a degree to which the flexible planar support frame bends.

18. The apparatus of claim 17, wherein the actuator comprises:
- a dial; and
- a translating element that translates rotation of the dial into linear movement of a bending element that is coupled to the flexible planar support frame and that bends the flexible planar support frame via linear movement.

19. The apparatus of claim 8, further comprising a rigid holding element, coupled to the flexible planar support frame at a center position between the left-eye display screen area and the right-eye display screen area, around which the flexible planar support frame bends.

20. The apparatus of claim 8, further comprising a pair of lenses coupled to the left eye cup and the right eye cup.

* * * * *